(12) United States Patent
Chang et al.

(10) Patent No.: US 7,038,886 B1
(45) Date of Patent: May 2, 2006

(54) POSITIONER FOR PRECISELY MOVING AN E-BLOCK OF A DISK DRIVE

(75) Inventors: Ken Chang, Saratoga, CA (US); Mike Mayo, Palo Alto, CA (US)

(73) Assignee: Maxtor Corporation, Longmont, CO (US)

( * ) Notice: Subject to any disclaimer, the term of this patent is extended or adjusted under 35 U.S.C. 154(b) by 135 days.

(21) Appl. No.: 10/842,773

(22) Filed: May 11, 2004

Related U.S. Application Data

(62) Division of application No. 09/769,005, filed on Jan. 23, 2001, now Pat. No. 6,768,614.

(51) Int. Cl.
*G11B 5/55* (2006.01)
*G11B 5/596* (2006.01)

(52) U.S. Cl. ............... 360/264.7; 360/265; 360/78.05; 360/78.12; 360/77.02; 360/265.8; 310/15

(58) Field of Classification Search .................... None
See application file for complete search history.

(56) References Cited

U.S. PATENT DOCUMENTS

| | | | |
|---|---|---|---|
| 5,267,110 A | 11/1993 | Ottesen et al. | 360/265 |
| 5,448,437 A * | 9/1995 | Katahara | 360/265 |
| 5,523,911 A | 6/1996 | Mita et al. | 360/106 |
| 5,621,591 A | 4/1997 | Rahimi et al. | 360/265 |
| 5,764,441 A | 6/1998 | Aruga et al. | 360/265 |
| 5,991,124 A | 11/1999 | Forbord | 360/265 |
| 6,043,957 A | 3/2000 | Hattori et al. | 360/294.3 |
| 6,104,581 A | 8/2000 | Huang et al. | 360/264.7 |
| 6,225,712 B1 | 5/2001 | Miyamoto et al. | 310/15 |

* cited by examiner

*Primary Examiner*—Andrew L. Sniezek
(74) *Attorney, Agent, or Firm*—David M. Sigmond

(57) ABSTRACT

A positioner (20) for a disk drive (10) that includes a magnet assembly (52), a conductor assembly (54), and a control system (22) is provided herein. The magnet assembly (52) includes a pair of magnet arrays (56A) (56B) and a pair of spaced apart flux return plates (75A) (75B). The conductor assembly (54) includes at least a first coil array (80) and a second coil array (82) that are substantially co-planar. The control system (22) directs current to electrically excite the coil arrays (80) (82) to maintain a data transducer (50) on a target track (32) of a storage disk (28).

40 Claims, 6 Drawing Sheets

POSITIONER FOR PRECISELY MOVING AN E-BLOCK OF A DISK DRIVE

CROSS-REFERENCE TO RELATED APPLICATIONS

This application is a divisional of U.S. application Ser. No. 09/769,005, filed Jan. 23, 2001 now U.S. Pat. No. 6,768,614.

FIELD OF THE INVENTION

The present invention relates generally to disk drives for storing and retrieving data. More specifically, the present invention relates to a positioner for a disk drive that precisely positions and maintains a data transducer on a target track of a storage disk. Further, the positioner is uniquely designed to minimize wear on an E-block and thereby decrease the likelihood of track mis-registration.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular regions of different radii, commonly referred to as "tracks". Typically, a head stack assembly having a positioner and an E-block is used to position a data transducer of a transducer assembly proximate each data storage surface of each storage disk. The data transducer transfers information to and from the storage disk when precisely positioned on the appropriate track of the storage surface. The transducer assembly also includes a load beam and a suspension for supporting the data transducer.

The need for increased storage capacity and compact construction of the disk drive has led to the use of disks having increased track density or decreased track pitch, i.e., more tracks per inch. As the tracks per inch increase, the ability to maintain the data transducer on a target track becomes more difficult. More specifically, as track density increases, it is necessary to reduce positioning error of the data transducer proportionally. With these systems, the accurate and stable positioning of the data transducer proximate the appropriate track is critical to the accurate transfer and/or retrieval of information from the rotating storage disks.

One attempt to improve positioning accuracy includes increasing the servo bandwidth of the positioner. Unfortunately, as the bandwidth of the positioner is increased, it approaches a resonant frequency of the head stack assembly and it becomes more difficult to keep the positioner stable.

Another attempt to raise servo bandwidth of the head stack assembly includes securing a pair of piezoelectric motors to the load beam of each transducer assembly. This configuration is known in the industry as a dual stage actuator. Unfortunately, existing dual actuators are not entirely satisfactory. For example, existing dual stage actuators typically add substantial cost to the disk drive because every transducer assembly includes a pair of piezoelectric motors. Further, the drive electronics for the dual stage actuator is more complex due to the need to generate positive and negative voltages well beyond the supply rails.

Yet another attempt to improve positioning accuracy includes utilizing a positioner having a pair of vertically offset coil arrays. This positioner design eliminates the major resonant frequency and allows for higher servo bandwidth by the positioner. Unfortunately, the vertically offset coil arrays generate a twisting moment on the E-block that can greatly influence the accuracy of positioning and can cause wear on the E-block.

In light of the above, it is an object of the present invention to significantly increase the servo bandwidth of the head stack assembly. Another object of the present invention is to provide a positioner that accurately positions the data transducers. Still another object of the present invention is to provide a positioner that prevents the exciting of the system mode at an E-block pivot center. Yet another object of the present invention is to increase servo bandwidth without the use of piezoelectric motors on each transducer assembly. Yet another object of the present invention is to reduce the cost of manufacturing a high density disk drive.

SUMMARY

The present invention is directed to a positioner for a head stack assembly of a disk drive. The disk drive includes one or more storage disks. The head stack assembly also includes an E-block, and one or more data transducers. The positioner moves the E-block and the data transducers relative to the storage disks of the disk drive. More specifically, the positioner moves the E-block and the data transducer to a target track of the storage disk. Additionally, the positioner accurately maintains the data transducer on the target track of the storage disk.

As provided herein, the positioner includes a magnet assembly, a conductor assembly, and a control system. The conductor assembly includes a first coil array and a second coil array that are positioned near the magnet assembly. The control system electrically excites the coil arrays to interact with the magnet assembly. Uniquely, the first coil array and the second coil array are substantially coplanar. As a result of this design, the positioner avoids the exciting of the major system mode at an E-block pivot center and the servo bandwidth of the positioner can be increased. Further, the accuracy in which the positioner positions the data transducer is increased. Moreover, the coplanar coil arrays do not generate a twisting moment on the E-block that can influence the accuracy of the positioner.

As used herein, the term "seek mode" refers to when the positioner is moving the E-block relative to the storage disks to position the data transducer onto the target track. Additionally, the term "on-track mode" refers to when the positioner is maintaining the data transducer on the target track.

A number of alternate embodiments of the positioner are provided herein. In a first embodiment, the first coil array encircles the second coil array. In this design, in seek mode, the control system electrically excites the first coil array to move the E-block, and the data transducer, relative to a storage disk to seek the target track on a storage disk. Subsequently, in the on-track mode, the control system electrically excites both the first coil array and the second coil array to generate opposed forces that maintain the data transducer on the target track of the storage disk. The opposed forces of the first and second coil arrays prevent exciting of the system mode of the head stack assembly.

In a second embodiment, the second coil array is positioned adjacent to and alongside of the first coil array. In this design, the first coil array is located closer to the E-block than the second coil array. In this design, in the seek mode, the control system electrically excites both coil arrays to move the data transducer to the target track. Alternately, in the on-track mode, the control system again electrically excites both the first coil array and the second coil array. In this mode, the coil arrays are electrically excited to generate substantially similar magnitude force but in opposite directions in order to maintain the data transducer on the target track.

In yet another embodiment, the positioner additionally includes a third coil array that is substantially co-planar with the first and second coil arrays. In this design, the first coil array encircles the second coil array and the third coil array. Further, the second coil array and the third coil array are positioned side by side. In this design, when the positioner is in "seek" mode, the control system electrically excites the first coil array to move the E-block so that the data transducer is positioned on the target track. Subsequently, in the "on-track" mode, the control system electrically excites the second coil array and the third coil array to maintain the data transducer on the target track.

The present invention is also directed to a disk drive and a method for retrieving data from a target track on a rotating storage disk of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
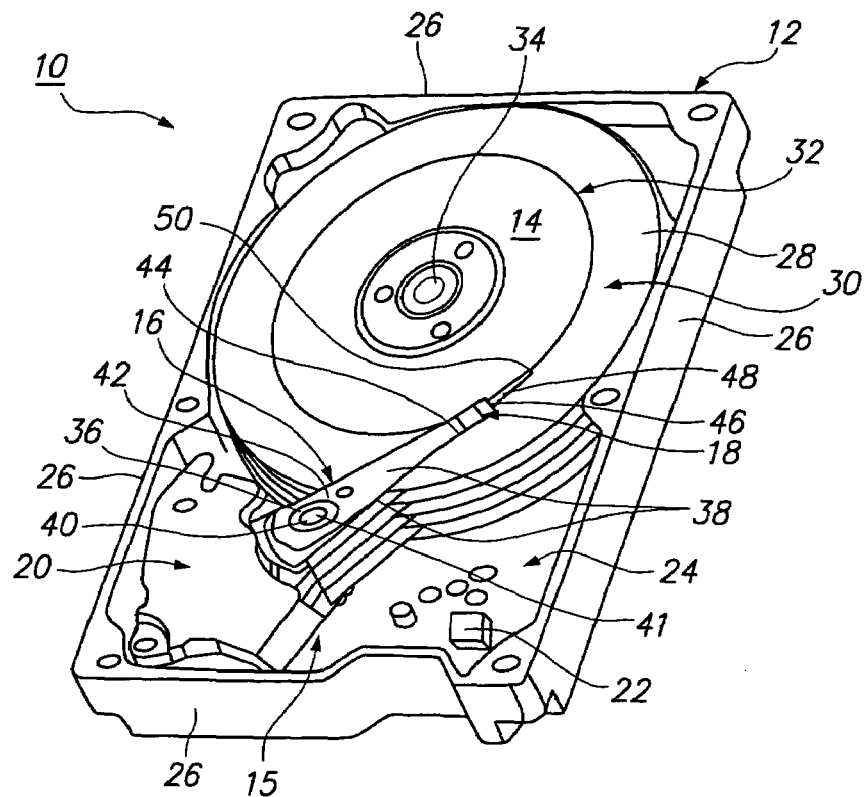
FIG. 1 is a perspective view of a disk drive having features of the present invention.

Referring initially to FIG. 1, a disk drive 10 according to the present invention includes (i) a drive housing 12, (ii) a disk assembly 14, (iii) a head stack assembly 15 including an E-block 16, one or more transducer assemblies 18, and a positioner 20, and (iv) a control system 22. As provided herein, the positioner 20 positions the transducer assemblies 18 with improved accuracy, avoids exciting the major system mode of the head stack assembly 15, and has a higher servo bandwidth.

A detailed description of the various components of a disk drive 10 is provided in U.S. Pat. No. 5,208,712, issued to Hatch et al., and assigned to Maxtor Corporation, the assignee of the present invention. The contents of U.S. Pat. No. 5,208,712 are incorporated herein by reference. Accordingly, only the structural aspects of a disk drive 10 that are particularly significant to the present invention; are provided in detail herein.

The drive housing 12 retains the various components of the disk drive 10. The drive housing 12, illustrated in FIG. 1, includes a base 24 and four (4) side walls 26. A typical drive housing 12 also includes a cover (not shown) that is spaced apart from the base 24 by the side walls 26. The drive housing 12 is typically installed in the case of a computer (not shown) or a word processor (not shown).

The disk assembly 14 includes one or more storage disks 28 that store data in a form that can be subsequently retrieved if necessary. Magnetic storage disks 28 are commonly used to store data in digital form. For conservation of space, each storage disk 28 preferably includes a data storage surface 30 on each side of the storage disk 28. These storage surfaces 30 are typically divided into a plurality of narrow annular regions of different radii, commonly referred to as "tracks." The positioner 20 provided herein allows for the use of storage disks 28 having higher track densities. The storage disks 28 are manufactured by ways known to those skilled in the art.

A target track 32 that contains the desired data (not shown) is illustrated in FIG. 1 on the top storage surface 30 on the top storage disk 28. It should be noted that the target track 32 illustrated in FIG. 1 is for reference and that any of the tracks on any of the storage disks 28 can be the target track 32.

Depending upon the design of the disk drive 10, any number of storage disks 28 can be used with the disk drive 10. For example, the disk drive 10 can include one (1), two (2), three (3), six (6), nine (9), or twelve (12) storage disks 28. For two-sided storage disks 28, the disks 28 are spaced apart a sufficient distance so that at least one (1) transducer assembly 18 can be positioned proximate each of the storage surfaces 30 of adjacent storage disks 28. To conserve space, a centerline (not shown) of consecutive disks 28 provides disks 28 typically spaced apart between about one millimeter (1.0 mm) to three millimeters (3.0 mm).

The storage disks 28 are mounted on a disk spindle 34 that is mounted to a spindle shaft (not shown). The spindle shaft is secured to the base 24. The disk spindle 34 rotates on a disk axis (not shown) relative to the spindle shaft on a spindle bearing assembly (not shown). Typically, the disk spindle 34 and the storage disks 28 are rotated about the disk axis at a predetermined angular velocity by a spindle motor (not shown).

The rotation rate of the storage disks 28 varies according to the design of the disk drive 10. Presently, disk drives 10 utilize disks 28 rotated at an angular velocity of between about 4,500 RPM to 10,000 RPM. It is anticipated that technological advances will allow for disk drives 10 having storage disks 28 which rotate at higher speeds, such as about 15,000 or more RPM.

As can best be seen with reference to FIG. 1, the E-block 16 includes an actuator hub 36 and a plurality of parallel actuator arms 38 that are attached to and cantilever from the actuator hub 36. In the embodiment illustrated in FIG. 1, the actuator hub 36 is substantially tubular and can be mounted to an actuator shaft 40. The actuator hub 36 rotates on an E-block pivot center 41 relative to the actuator shaft 40 on an actuator bearing assembly (not shown).

The actuator arms 38 move with the actuator hub 36 and position the transducer assemblies 18 between the storage disks 26, proximate the data storage surfaces 30. Each actuator arm 38 includes a proximal section 42 that is secured to the actuator hub 36 and a distal section 44 that cantilevers away from the actuator hub 36. The spacing of the actuator arms 38 varies according to the spacing of the storage disks 28. The distance between consecutive actuator arms 38 is typically between about one millimeter (1 mm) to three millimeters (3 mm).

The transducer assemblies 18 transfer or transmit information between the computer (not shown) or word processor (not shown) and the storage disks 28. Typically, each transducer assembly 18 includes a load beam 46, a flexure 48, and a data transducer 50. The load beam 46 attaches the flexure 48 and the data transducer 50 to the E-block 16. Preferably, each load beam 46 is flexible in a direction perpendicular to the storage disk 28 and acts as a spring for supporting the data transducer 50.

Each flexure 48 is used to attach one (1) of the data transducers 50 to one (1) of the load beams 46. Typically, each flexure 48 includes a plurality of conductive flexure traces (not shown) that are electrically connected to the data transducer 50. Each flexure 48 is subsequently attached to a flex circuit (not shown) that electrically connects the flexures 48 to the disk drive 10.

Each data transducer 50 interacts with one (1) of the storage disks 28 to access or transfer information to the storage disk 28. For a magnetic storage disk 28, the data transducer 50 is commonly referred to as a read/write head.

Figure 2:
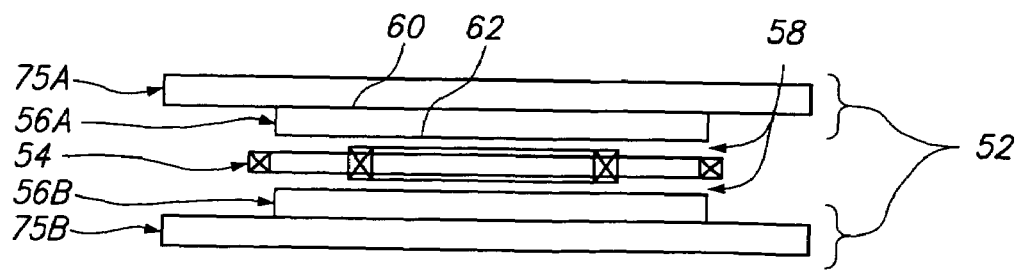
FIG. 2 is a rear view of a positioner having features of the present invention.

The positioner 20 precisely moves and positions the E-block 16 and the data transducers 50 relative to the storage disks 28. The design of the positioner 20 can varied in accordance with the teachings provided herein. A number of alternate embodiments are provided herein. In each embodiment, referring to FIG. 2, the positioner 20 includes a magnet assembly 52 and a conductor assembly 54. Further, in each embodiment the positioner 20 positions and maintains the position of the data transducers 50 with improved accuracy, eliminates the major system mode of the head stack assembly 15, and allows for a higher servo bandwidth.

The magnet assembly 52 includes one or more magnet arrays. In the embodiments provided herein, the magnet assembly 52 includes an upper magnet array 56A and a lower magnet array 56B that are spaced apart by an air gap 58. Each magnet array 56A, 56B includes one or more magnets. Alternatively, the positioner 20 could include a single magnet array.

In the embodiments illustrated in the Figures, each magnet array 56A, 56B is somewhat arc-shaped and includes a substantially flat top surface 60, a spaced apart, substantially flat bottom surface 62, an arc shaped inner side 64, an arc shaped outer side 66, and a pair of spaced apart radial sides 68. A transition zone 70 vertically divides the each magnet array 56A, 56B into a first sector 72 and a second sector 74 which are side-by-side. The transition zone 70 is represented by dashed lines. Each of the sectors 72, 74, when magnetized, has a north pole and a south pole. The poles of the first and second sectors 72, 74, for the upper magnet array 56A are inverted relative to each other, and the first and second sectors 72, 74 for the lower magnet array 56B are inverted relative to each other. Further, (i) the poles of the first sector 72 of the upper magnet array 56A and poles of the first sector 72 of the lower magnet array 56B are opposed and (ii) the poles of the second sector 74 of the upper magnet array 56A and poles of the second sector 74 of the lower magnet array 56B are opposed.

Preferably, the magnet assembly 52 includes an upper flux return plate 75A and a spaced apart lower flux return plate 75B. The flux return plates 75A, 75B serve as a return path for magnetic fields from the magnet arrays 56A, 56B. Each return plate 75A, 75B is preferably made of a magnetically permeable material such as a soft iron or steel. Typically, the return plates 75A, 75B are secured to the base 24. Further, the upper magnet array 56A is secured to the upper return plate 75A and the lower magnet array 56B is secured to the lower return plate 75B.

The conductor assembly 54 includes a conductor housing 76, and a coil set 78. In each embodiment, the conductor housing 76 secures the coil set 78 to the E-block 16, with at least a portion of the coil set 78 positioned in the air gap 58 between the magnet arrays 56A, 56B. The conductor housing 76 can be a separate component from the E-block 16 or the conductor housing 76 can be formed as an integral part of the E-block 16.

The coil set 78 interacts with the magnet assembly 52 to precisely move the E-block 16 and each data transducer 50 relative to the storage disks 28. A number of alternate embodiments of the coil set 78 are provided herein. However, those skilled in the art will recognize that other embodiments are possible with the teachings provided herein. As an overview, in each embodiment, the coil set 78 includes a first coil array 80 and a second coil array 82 that are coplanar. Further, in the embodiment illustrated in FIGS. 3A and 3B, the coil set 78 also includes a third coil array 84 that is coplanar with the first coil array 80 and a second coil array 82. As provided herein, each of the coil arrays 80, 82, 84 includes a wire that is wrapped into a plurality of turns or coils. Because the coil arrays 80, 82, 84 are coplanar, the positioner 20 does not generate a twisting moment on the E-block 16 and the size of the positioner 20 is not increased.

Figure 3A:
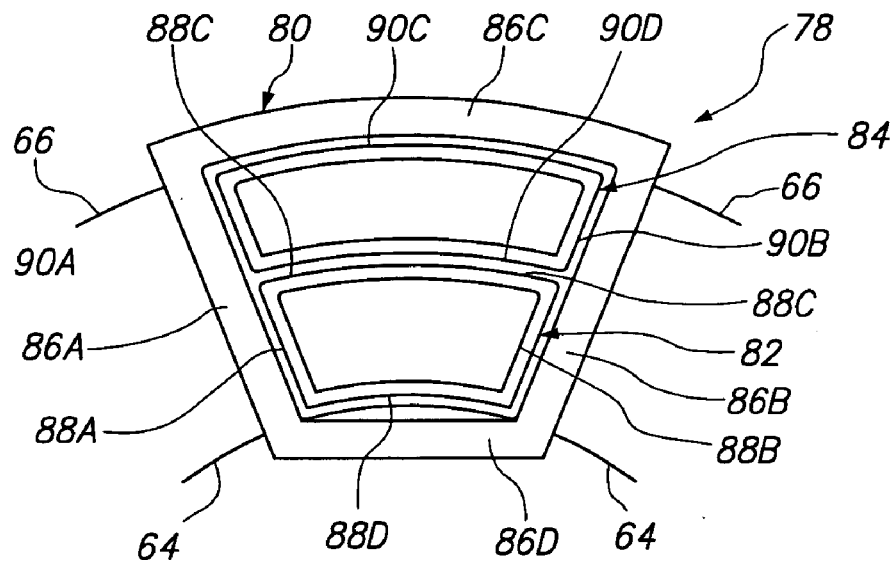
FIG. 3A is a top view of a first embodiment of a coil set having features of the present invention.
Figure 3B:
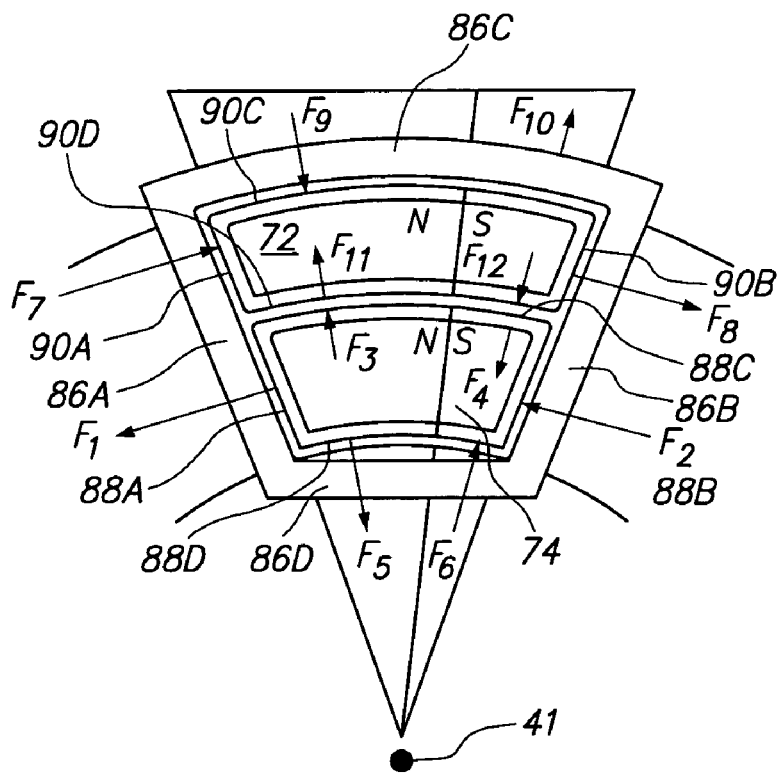
FIG. 3B is a force diagram of the coil set illustrated in FIG. 3A.

FIGS. 3A and 3B illustrate a first embodiment of a coil set 78 having features of the present invention. In this embodiment, the coil set 78 includes the first coil array 80, the second coil array 82 and the third coil array 84. In this embodiment, each coil array 80, 82, 84 is somewhat flat, and trapezoidal shaped. Further, in this embodiment, the first coil array 80 encircles the second coil array 82 and the third coil array 84. Stated another way, the second coil array 82 and the third coil array 84 are positioned within the first coil array 80. Moreover, the third coil array 84 and the second coil array 82 are positioned side-by-side and adjacent to each other. All of the coil arrays 80, 82, 84 are positioned in substantially the same plane. Additionally, the second coil array 82 is positioned closer to the actuator hub 36 (not shown in FIGS. 3A and 3B) and the E-block pivot center 41 than the third coil array 84.

The first coil array 80 includes a first left leg 86A, a first right leg 86B, a first distal section 86C and a first proximal section 86D. Similarly, the second coil array 82 includes a second left leg 88A, a second right leg 88B, a second distal section 88C and a second proximal section 88D. Further, the third coil array 84 includes a third left leg 90A, a third right leg 90B, a third distal section 90C and a third proximal section 90D. For each respective coil array 80, 82, 84, the proximal section 86D, 88D, 90D is positioned closest to the E-block 16 while the distal section 86C, 88C, 90C is positioned farther from the E-block 16. Each distal section 86C, 88C, 90C and each proximal section 86D, 88D, 90D is somewhat arc-shaped. Further, each left leg 86A, 88A, 90A and each right leg 86B, 88B, 90B is generally straight and is positioned generally radially from the E-block pivot center 41.

In the embodiment of FIG. 3A, the second coil array 82 is positioned such that (i) the second proximal section 88D is near the first proximal section 86D, (ii) the second left leg 88A is substantially parallel to and adjacent to the first left leg 86A, and (iii) the second right leg 88B is substantially parallel to and adjacent to the first right leg 86B. The third coil array 84 is positioned so that (i) the third proximal section 90D is positioned adjacent the second distal section 88C, (ii) the third distal section 90C is adjacent the first distal section 86C, (iii) the third left leg 90A is generally parallel to and adjacent the first left leg 86A, and (iv) the third right leg 90B is substantially parallel to and adjacent with the first right leg 86B.

The control system 22 directs current to the coil set 78 to move the coil set 78 relative to the magnet assembly 52 and the E-block 16 relative to the disk assembly 14. The design of the control system 22 will depend upon the design of the coil set 78, the desired movement of the E-block 16. In each embodiment, the control system 22 directs current to at least one of the coil arrays 80, 82, 84 to move the E-block 16 relative to the disk assembly 14. Further, the control system 22 independently directs current to at least two of the coil arrays 80, 82, 84 to maintain the data transducer 50 on the target track 32. The control system 22 controls current to the positioner 20 based upon whether the positioner 20 is in "seek mode" or "on-track mode". The control system 22 can include, for example, an individual controller (not shown) for each of the coil arrays 80, 82, 84. Alternatively, a single controller 22 may control the flow of current in the coil set 78.

In the embodiment illustrated in FIGS. 3A and 3B, in the "seek mode" the control system 22 directs current to the first coil array 80 to move the coil set 78 relative to the magnet assembly 52 and move the data transducer 50 relative to the target track 32. In this design, the electrically excited first coil array 80 interacts with the magnet assembly 52 to create a Lorentz type force that moves the coil set 78 relative to the magnet assembly. More specifically, the resultant magnetic fields of the magnet assembly 52 are such that current passing through the first coil array 80 in one direction causes rotation of the actuator arms 38 in one radial direction relative to the disks 28 (such as the radially outward direction) while reverse current causes reverse direction movement (such as the radially inward direction). Alternately, to decrease the seek time of the positioner 20 while is the seek mode, the control system 22 can also direct current to the second coil array 82 and/or the third coil array 84.

In the on-track mode, in FIGS. 3A and 3B, the control system 22 independently directs current to the second coil array 82 and the third coil array 84 to maintain the data transducer 50 (not shown in FIGS. 3A and 3B) on the target track 32 (not shown in FIGS. 3A and 3B). More specifically, the control system 22 directs current to the second coil array 82 and the third coil array 84 so that the Lorentz type force generated by the electrically excited second coil array 82 is substantially equal and opposite to the Lorentz type force generated by the electrically excited third coil array 84. As provided herein, the current to the second coil array 82 is opposite in direction to the current directed to the third coil array 84. If the design of the second coil array 82 and the third coil array 84 is the same, and the magnetic flux is the same, then the magnitude of the current to the second coil array 82 and the third coil array 84 should be approximately the same. Alternately, magnitude of the current to the second coil array 82 and the third coil array 84 can be adjusted appropriately so that the force generated by the second coil array 82 is equal and opposite to the force generated by the third coil array 84.

FIG. 3B illustrates the Lorenz-type forces created by the positioner 20 when in the positioner 20 is in the on-track mode. When the positioner 20 is in "on-track mode", the sum of the forces generated with respect to the second coil array 82 are equal to and directionally opposite the sum of the forces generated with respect to the third coil array 84. In this design, for the second coil array 82, (i) the second left leg 88A produces a first force $F_1$, (ii) the second right leg 88B produces a second force $F_2$, (iii) the second distal section 88C produces a third force $F_3$ and a fourth force $F_4$, (iv) the second proximal section 88D produces a fifth force $F_5$, and a sixth force $F_6$. Similarly, for the third coil array 84 (i) the third left leg 90A produces a seventh force $F_7$, (ii) the third right leg 90B produces an eighth force $F_8$, (iii) the third distal section 90C produces a ninth force $F_9$ and a tenth force $F_{10}$ and (iv) the third proximal section 90D produces an eleventh force $F_{11}$ and a twelfth force $F_{12}$.

In the on track mode, current to the second coil array 82 and the third coil array 84 is controlled so that (i) force $F_1$ is equal in magnitude, but directionally the opposite of force $F_7$, resulting in a "force couple", and (ii) $F_2$ is equal in magnitude, but directionally the opposite of force $F_8$, again resulting in a force couple. Thus, there is no net reaction force or torque on the actuator hub 36. Moreover, the remaining forces on the tangential parts of the coil arrays 82, 84 result in force couples: $F_3+F_{11}=F_5+F_9$; and $F_4+F_{12}=F_{10}+F_6$. As a consequence, no reaction force and lateral force about the actuator hub 36 occurs while the positioner is in "on-track mode".

In this design, because the second coil array 82 and the third coil array 84 are used to maintain the data transducer 50 on the target track 32, the second coil array 82 and the third coil 84 array can be made with more turns and thinner wire than the first coil array 80.

Further, the control system 22 in the on-track mode can direct current to the first coil array 80 for low frequencies to correct for bias and repetitive runout correction. All of the force applied by the first coil array 80 invokes a reaction force at the E-block pivot center 41, thus potentially exciting the "system mode". Therefore, care must be taken to avoid frequency components above a few hundred hertz. The second coil array 82 and the third coil array 84 should be used to apply as much as possible of the high frequency components of the seek current. This reduces excitation of the system mode and reduces the acoustic radiation caused by high frequency coupling into the base 24 and cover (not shown) via the actuator hub 36. Possibly the control system 22 will pass the current command through a virtual crossover network thereby explicitly separating the current for the second coil array 82 and the third coil array 84 in the frequency domain.

Figure 4A:
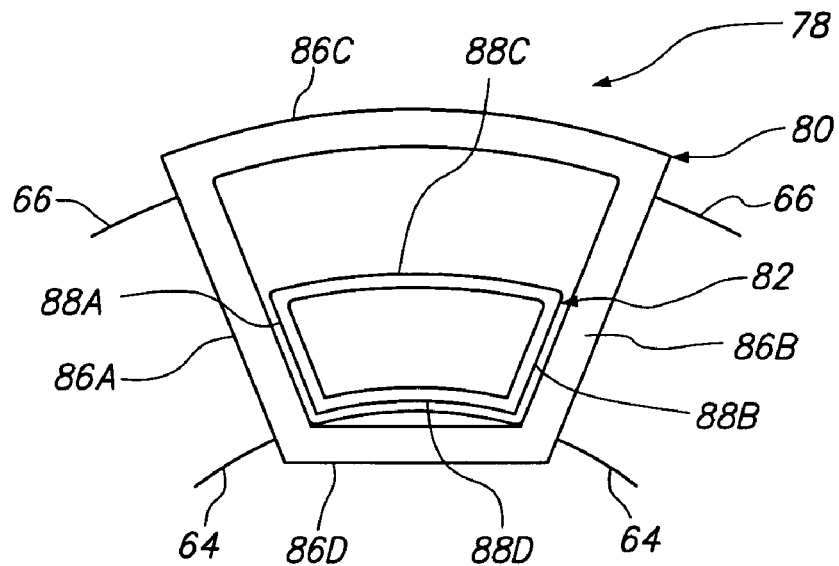
FIG. 4A is a top view of a second embodiment of a coil set having features of the present invention.
Figure 4B:
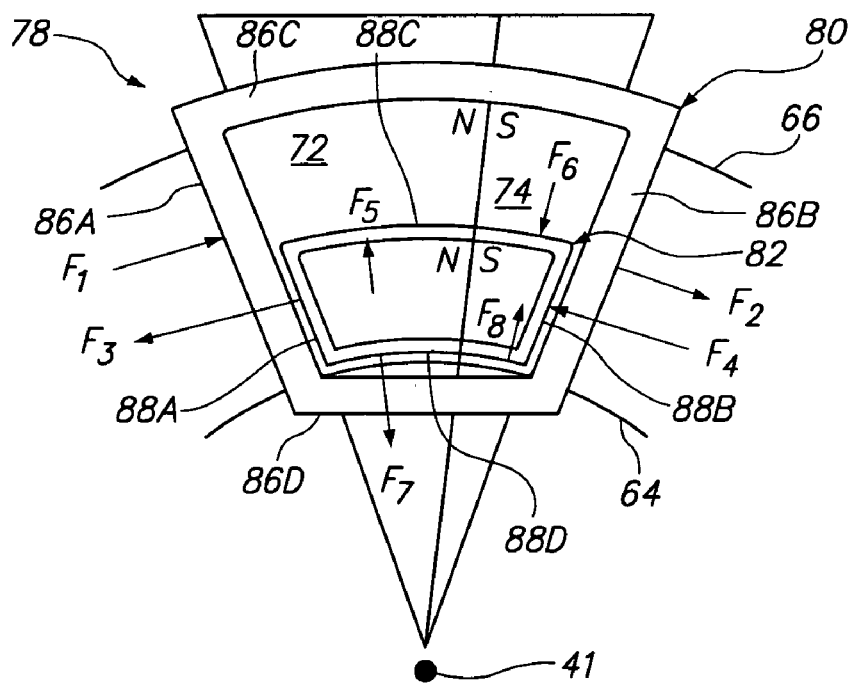
FIG. 4B is a force diagram of the coil set illustrated in FIG. 4A.

FIGS. 4A and 4B depict another embodiment of the present invention. In this embodiment, the coil set 78 includes the first coil array 80 and the second coil array 82 which are substantially co-planar. The positioning of the first coil array 80 and the second coil array 82 in this embodiment are substantially similar to the positioning of the first coil array 80 and second coil array 82, respectively, shown in FIG. 3A. However, the embodiment of FIG. 4A does not include the third coil array 84.

The control system 22 directs current to the coil set 78 to move the coil set 78 relative to the magnet assembly 52, the E-block 16 relative to the disk assembly 14, and the data transducer 50 relative to the storage disks 28. In this embodiment, the control system 22 directs current to at least one of the coil arrays 80, 82 to move the E-block 16 relative to the disk assembly 14. Further, the control system 22 independently directs current to both of the coil arrays 80, 82 to maintain the E-block 16 in position with the data transducer 50 on the target track 32.

In the embodiment illustrated in FIGS. 4A and 4B, in the seek mode, the control system 22 directs current to the first coil array 80 to move the coil set 78 relative to the magnet assembly 52 and move the data transducer 50 to the target track 32. In this design, the electrically excited first coil array 80 generates a Lorentz type force that moves the coil set 78 relative to the magnet assembly 52. Alternately, to decrease the seek time of the positioner 20, the control system 22 can also direct current to the second coil array 82.

In the on-track mode, the control system 22 independently directs current to the second coil array 82 and the first coil array 80 to maintain the data transducer 50 on the target track 32. More specifically, the control system 22 controls current to the second coil array 82 and the first coil array 80 so that the Lorentz type force generated by the electrically excited second coil array 82 is substantially equal and opposite to the Lorentz type force generated by the electrically excited first coil array 80. As provided herein, the current to the second coil array 82 is opposite in direction to the current directed to the first coil array 80. In this embodiment, the design of the second coil array 82 and the first coil array 80 are not the same. Thus, the control system 22 balances the magnitude of the current to the first coil array 80 and the second coil array 82 appropriately.

FIG. 4B illustrates the Lorenz-type forces created by the positioner 20 when the positioner 20 is in the on-track mode. When the positioner 20 is in "on-track mode", the sum of the forces generated with respect to the first coil array 80 are equal to and directionally opposite the sum of the forces generated with respect to the second coil array 82. In this design, for the first coil array 80, (i) the first left leg 86A produces a first force $F_1$, (ii) the first right leg 86B produces a second force $F_2$, (iii) the first distal section 86C and the first proximal section 86D do not produce a force because these sections 86C, 86D, are not positioned between the magnet arrays 56A, 56B. Thus the first distal section 86C and the first proximal section 86D do not interact with the magnetic field. With respect to the second coil array 82 (i) the second left leg 88A produces a third force $F_3$, (ii) the second right leg 88B produces a fourth force $F_4$, (iii) the second distal section 88C produces a fifth force $F_5$ and a sixth force $F_6$ and (iv) the second proximal section 88D produces a seventh force $F_7$ and a eighth force $F_8$.

In the on track mode, the control system 22 provides current to the first coil array 80 and the second coil array 82. The forces are controlled so that (i) force $F_1$ is equal in magnitude, but directionally the opposite of force $F_3$, resulting in a force couple, and (ii) force $F_2$ is equal in magnitude, but directionally the opposite of force $F_4$, again resulting in a force couple. Thus, there is no net reaction force on the actuator hub 36. Moreover, the remaining forces generated result in force couples: $F_5=F_7$; and $F_6=F_8$. Therefore, no net reaction force is imparted on the actuator hub 36, resulting in less wear on the actuator hub 36, longer life of the actuator hub 36, and a decreased likelihood of track mis-registration.

Figure 5A:
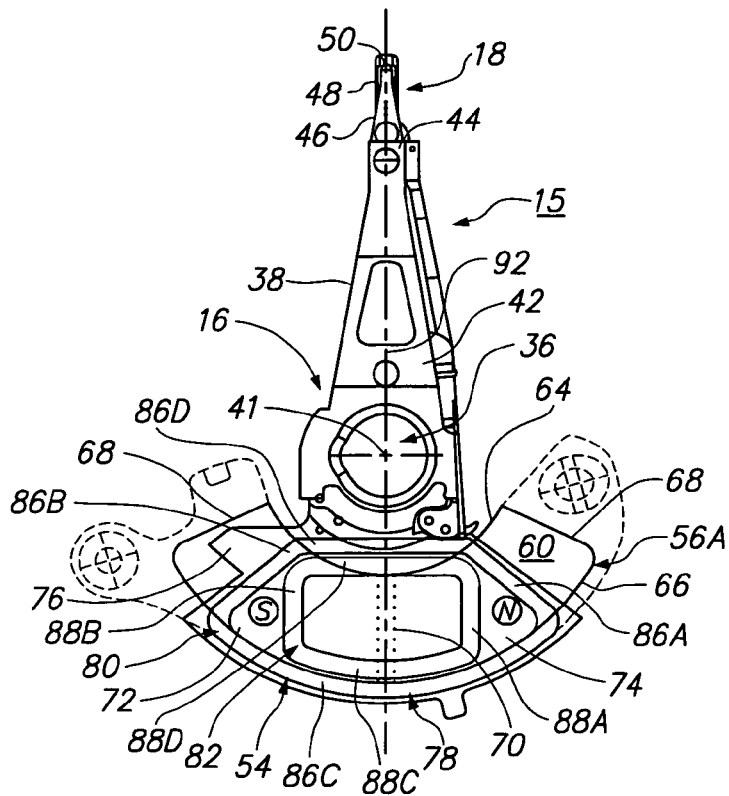
FIG. 5A is a top view of a third embodiment of a portion of a positioner, an E-block and a transducer assembly.

FIG. 5A illustrates yet another embodiment of the present invention. In this embodiment, the coil set 78 includes the first coil array 80 and the second coil array 82. The configuration of the first coil array 80 of this embodiment is somewhat similar to that of the first coil array 80 depicted in FIGS. 3A and 4A. The second coil array 82 is substantially co-planar with the first coil array 80, and is encircled by the first coil array 80. The second coil array 82 is generally rectangular in shape. In this embodiment, the second distal section 88C is preferably shaped generally as an arc section of a circle with its center at the actuator hub 36, and is generally concentric with the first distal member 86C. The second legs 88A, 88B are substantially parallel to each other, and are substantially parallel to a longitudinal axis 92 of the E-block 16.

In the embodiment illustrated in FIG. 5A, the control system 22 directs current to the first coil array 80 to move the coil set 78 relative to the magnet assembly 52 and move the data transducer 50 to the target track 32. In this design, the electrically excited first coil array 80 generates a Lorentz type force that moves the coil set 78 relative to the magnet assembly 52. Alternatively, to decrease the seek time of the positioner 20, the control system 22 can also direct current to the second coil array 82.

Figure 5B:
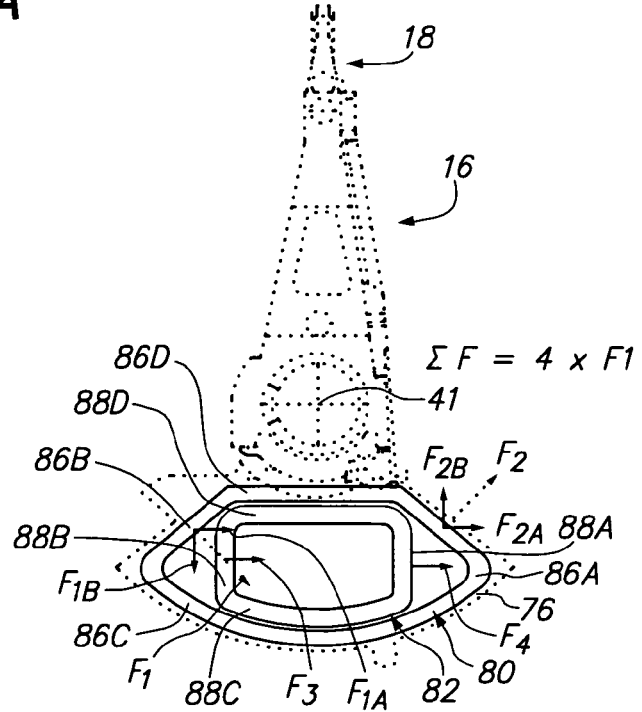
FIG. 5B is a force diagram of the embodiment illustrated in FIG. 5A when the positioner is in a "seek" mode.
Figure 5C:
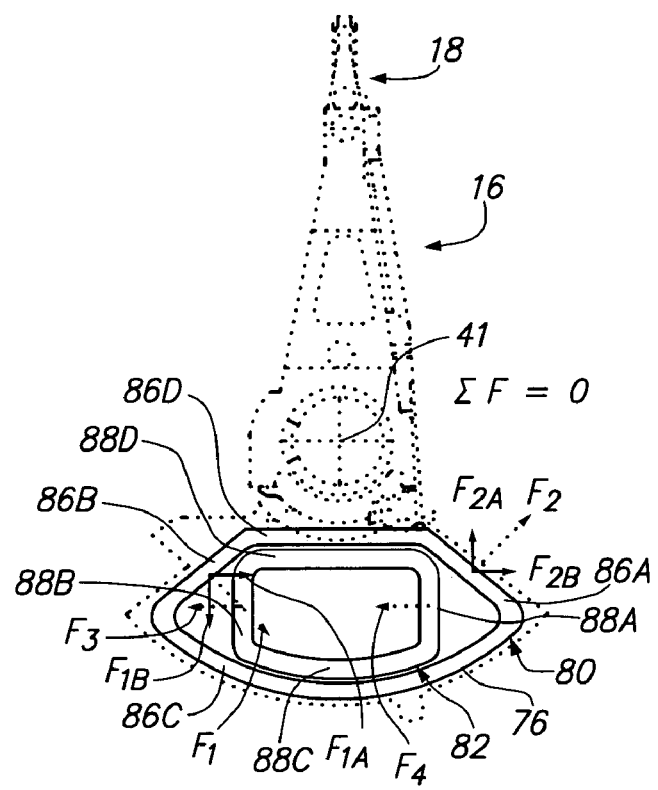
FIG. 5C is a force diagram of the embodiment illustrated in FIG. 5A when the positioner is in an "on-track" mode.

In the on-track mode, as illustrated in FIG. 5C, the control system 22 independently directs current to the first coil array 80 and the second coil array 82 to maintain the data transducer 50 on the target track 32. More specifically, the control system 22 controls current to the first coil array 80 and the second coil array 82 so that the Lorentz type force generated by the electrically excited first coil array 80 is substantially equal and opposite to the Lorentz type force generated by the electrically excited second coil array 82. As provided herein, the current to the first coil array 80 is opposite in direction to the current directed to the second coil array 82. The magnitude of the current to the first coil array 80 and the second coil array 82 can be adjusted appropriately by the control system 22 to compensate for the differences in size of the coil arrays 80, 82.

FIG. 5B illustrates the forces of the coil set 78 with the control system 22 in the seek mode. In this embodiment, the first coil array 80 and the second coil array 82 cooperate to move the E-block 16 to a target track 32 of the storage disk 28. More specifically, the first left leg 86A generates a first force F1 having two force vectors $F_{1A}$, $F_{1B}$ which are perpendicular to one another. Similarly, the first right leg 86B generates a second force F2 having two force vectors $F_{2A}$, $F_{2B}$ that are perpendicular to one another. Further, the second left leg 88A generates a third force F3 and the second right leg 88B generates a fourth force F4. In the seek mode, the force $F_{1B}$ from the first left leg 86A is equal in magnitude and directionally opposite the force $F_{2B}$ from the second coil leg 88A resulting in a force couple. In contrast, the $F_{1A}$, $F_{2A}$, F3 and F4 forces are substantially equal in magnitude, and are substantially directionally similar. Therefore, with this embodiment of the positioner 20, in the seek mode, the coils 80, 82, work in concert to move the E-block 16 relative to the target track 32 of the storage disk 28.

When the embodiment of the present invention shown in FIG. 5A is in the on-track mode, the first coil array 80 and the second coil array 82 oppose each other to maintain the data transducer 50 on the target track 32 of the storage disk 28. Referring to FIG. 5C, the forces generated by the first coil array 80 remain essentially unchanged from the first coil array 80 forces when the positioner 20 is in "seek mode". The F3, F4 forces generated by the second coil array 82, however, reverse direction in order to oppose the $F_{1A}$, $F_{2A}$ forces of the first coil array 80. The result is a sum total of zero force in the direction perpendicular to the longitudinal axis 92 of the E-block 16. Once again, a force couple exists with respect to the $F_{1B}$, $F_{2B}$ forces. The net result is less wear and longer life for the actuator hub 36, and a decreased likelihood of track mis-registration.

Figure 6A:
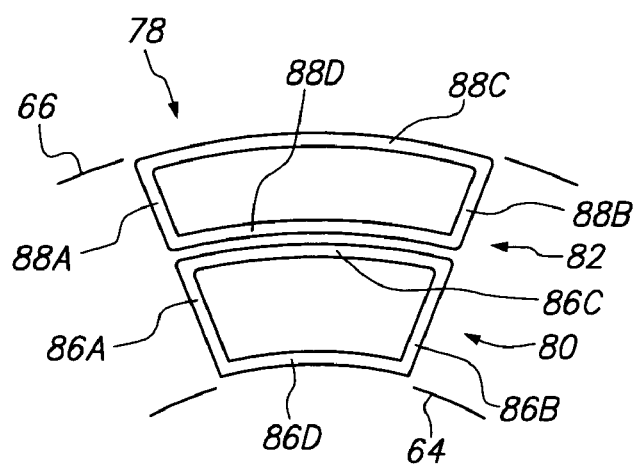
FIG. 6A is a top view of a fourth embodiment of a coil set having features of the present invention.

FIG. 6A shows still another alternative embodiment of the present invention, which includes the first coil array 80 and the second coil array 82 which are co-planar, and are oriented substantially similar to the second coil array 82 and third coil array 84, respectively, of FIG. 3A. The embodiment shown in FIG. 6A, however, does not include the third coil array 84.

In the embodiment illustrated in FIG. 6A, the control system 22 directs current to the first coil array 80 to move the coil set 78 relative to the magnet assembly 52 and move the data transducer 50 to the target track 32. In this design, the electrically excited first coil array 80 generates a Lorentz type force that moves the coil set 78 relative to the magnet assembly 52. Alternatively, to decrease the seek time of the positioner 20, the control system 22 can also direct current to the second coil array 82.

In the on-track mode of this embodiment, the control system 22 independently directs current to the first coil array 80 and the second coil array 82 to maintain the data transducer 50 on the target track 32. More specifically, the control system 22 controls current to the first coil array 80 and the second coil array 82 so that the Lorentz type force generated by the electrically excited first coil array 80 is substantially equal and opposite to the Lorentz type force generated by the electrically excited second coil array 82. As provided herein, the current to the first coil array 80 is opposite in direction to the current directed to the second coil array 82. The magnitude of the current to the first coil array 80 and the second coil array 82 can be adjusted appropriately by the control system 22 to compensate for the differences in size of the coil arrays 80, 82.

Figure 6B:
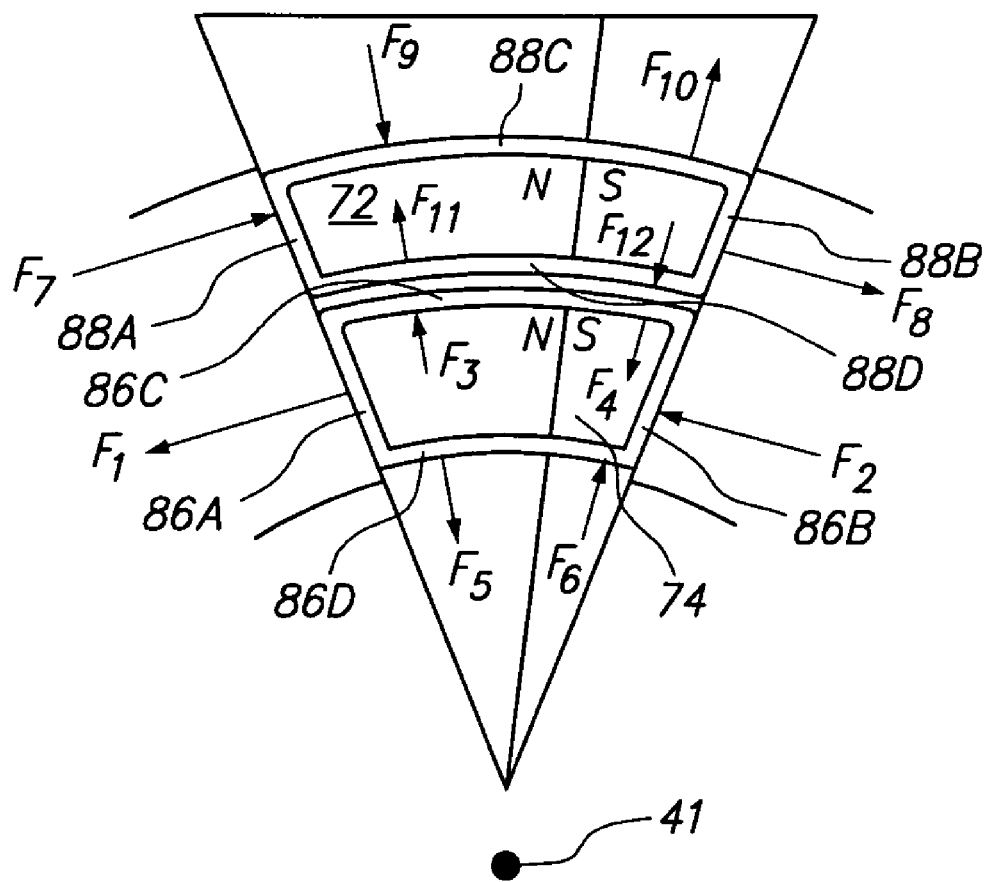
FIG. 6B is a force diagram of the coil set illustrated in FIG. 6A.

FIG. 6B illustrates the Lorenz-type forces created by the positioner 20 in the on-track mode. When the positioner 20 is in "on-track mode", the sum of the forces generated with respect to the second coil array 82 are equal to and directionally opposite the sum of the forces generated with respect to the first coil array 80. In this design, for the first coil array 80, (i) the first left leg 86A produces a first force $F_1$, (ii) the first right leg 86B produces a second force $F_2$, (iii) the first distal section 86C produces a third force $F_3$ and a fourth force $F_4$, and (iv) the first proximal section 86D produces a fifth force $F_5$, and a sixth force $F_6$. Similarly, for the second coil array 82 (i) the second left leg 88A produces a seventh force $F_7$, (ii) the second right leg 88B produces an eighth force $F_8$, (iii) the second distal section 88C produces a ninth force $F_9$ and a tenth force $F_{10}$ and (iv) the second proximal section 88D produces an eleventh force $F_{11}$ and a twelfth force $F_{12}$.

In the on track mode, current to the first coil array 80 and the second coil array 82 is controlled so that (i) force $F_1$ is equal in magnitude, but directionally the opposite of force $F_7$, resulting in a force couple, and (ii) force $F_2$ is equal in magnitude, but directionally the opposite of force $F_8$, again resulting in a force couple. Thus, there is no net reaction force or torque on the actuator hub 36. Moreover, the remaining forces on the tangential parts of the coil arrays 80, 82 result in force couples: $F_3+F_{11}=F_5+F_9$; and $F_4+F_{12}=F_{10}+F_6$. As a consequence, no reaction force and lateral force about the actuator hub 36 occurs while the positioner is in the on-track mode.

In the seek mode of this embodiment, the conductor assembly 54 depicted in FIG. 6A will maintain the force couples of $F_3+F_{11}=F_5+F_9$; and $F_4+F_{12}=F_{10}+F_6$. However, the forces $F_1$, $F_2$, $F_7$ and $F_8$ will cooperate to move the E-block 16 to a target track 32 on a storage disk 28. To accomplish this, the control system 22 reverses the current flowing in either the first coil array 80 or the second coil array 82. Thus, either the forces $F_1$ and $F_2$ from the first coil array 80 will reverse direction, or the forces $F_7$ and $F_8$ from the second coil array 82 will reverse direction, such that all forces, $F_1$, $F_2$, $F_7$ and $F_8$ will be substantially directionally aligned to move the E-block 16 relative to the target track 32 of a storage disk 28.

While the particular positioner 20 and disk drive 10 as herein shown and disclosed in detail is fully capable of attaining the objectives and providing the advantages herein before stated, it is to be understood that it is merely illustrative of the presently preferred embodiments of the invention and that no limitations are intended to the details of construction or design herein shown other than as described in the appended claims.

What is claimed is:

1. A positioner for moving an E-block and a data transducer of a disk drive relative to a storage disk of the disk drive, the positioner comprising:
    a magnet assembly producing a magnetic field; and
    a conductor assembly that couples to the E-block and is positioned near the magnet assembly, the conductor assembly including (i) a first coil array, and (ii) a second coil array positioned in substantially the same plane as the first coil array, wherein
        the first coil array includes a first left leg, a first right leg, a first distal section and a first proximal section, the first left leg extends between the first distal section and the first proximal section, the first right leg extends between the first distal section and the first proximal section and is spaced from the first left leg, the first distal section extends between the first left leg and the first right leg, and the first proximal section extends between the first left leg and the first right leg and is spaced from the first distal section and is closer to the E-block than the first distal section is to the E-block,
        the second coil array includes a second left leg, a second right leg, a second distal section and a second proximal section, the second left leg extends between the second distal section and the second proximal section, the second right leg extends between the second distal section and the second proximal section and is spaced from the second left leg, the second distal section extends between the second left leg and the second right leg, and the second proximal section extends between the second left leg and the second right leg and is spaced from the second distal section and is closer to the E-block than the second distal section is to the E-block, and
    the first coil array encircles the second coil array, and the second left leg is parallel to the second right leg.

2. The positioner of claim 1 wherein
    the first left leg and the first right leg interact with the magnetic field and the first distal section and the first proximal section do not interact with the magnetic field; and
    the second left leg, the second right leg, second distal section and the second proximal section interact with the magnetic field.

3. The positioner of claim 1 wherein the first left leg, the first right leg and the first proximal section are straight, and the first distal section is arc-shaped.

4. The positioner of claim 1 wherein the second left leg, the second right leg and the proximal section are straight, and the second distal section is arc-shaped.

5. The positioner of claim 1 wherein
    the first left leg, the first right leg and the first proximal section are straight, and the first distal section is arc-shaped; and the second left leg, the second right leg and the proximal section are straight, and the second distal section is arc-shaped.

6. The positioner of claim 1 wherein the first left leg is not parallel to the first right leg.

7. The positioner of claim 1 wherein the first left leg is not parallel to the second left leg.

8. The positioner of claim 1 wherein the first right leg is not parallel to the second right leg.

9. The positioner of claim 1 wherein the first left leg and the first right leg are not parallel to the second left leg and the second right leg and are not parallel to each other.

10. The positioner of claim 1 wherein the first distal section is adjacent to the second distal section, and the first proximal section is adjacent to the second proximal section.

11. The positioner of claim 1 wherein the first proximal section is parallel to and adjacent to the second proximal section.

12. The positioner of claim 1 wherein the first distal section is adjacent to the second distal section, and the first proximal section is parallel to and adjacent to the second proximal section.

13. The positioner of claim 1 wherein the first left leg is closer to the second proximal section than the second distal section.

14. The positioner of claim 1 wherein the first right leg is closer to the second proximal section than the second distal section.

15. The positioner of claim 1 wherein
the first left leg is closer to the second proximal section than the second distal section; and
the first right leg is closer to the second proximal section than the second distal section.

16. The positioner of claim 1 wherein the first distal section intersects an imaginary line that extends through and is orthogonal to the second left leg and the second right leg.

17. The positioner of claim 1 wherein
the first left leg, the first right leg and the first proximal section are straight, and the first distal section is arc-shaped;
the second left leg, the second right leg and the proximal section are straight, and the second distal section is arc-shaped;
the first left leg is not parallel to the first right leg;
the first left leg is not parallel to the second left leg;
the first right leg is not parallel to the second right leg;
the first distal section is adjacent to the second distal section; and
the first proximal section is parallel to and adjacent to the second proximal section.

18. The positioner of claim 1 wherein
the first left leg is not parallel to the first right leg;
the first left leg is not parallel to the second left leg;
the first right leg is not parallel to the second right leg;
the first distal section is adjacent to the second distal section;
the first proximal section is parallel to and adjacent to the second proximal section;
the first left leg is closer to the second proximal section than the second distal section; and
the first right leg is closer to the second proximal section than the second distal section.

19. The positioner of claim 1 wherein
the first left leg, the first right leg and the first proximal section are straight, and the first distal section is arc-shaped;
the second left leg, the second right leg and the proximal section are straight, and the second distal section is arc-shaped;
the first left leg is not parallel to the first right leg;
the first left leg is not parallel to the second left leg;
the first right leg is not parallel to the second right leg;
the first distal section is adjacent to the second distal section;
the first proximal section is parallel to and adjacent to the second proximal section;
the first left leg is closer to the second proximal section than the second distal section; and
the first right leg is closer to the second proximal section than the second distal section.

20. The positioner of claim 19 wherein the first distal section intersects an imaginary line that extends through and is orthogonal to the second left leg and the second right leg.

21. A positioner for moving an E-block and a data transducer of a disk drive relative to a storage disk of the disk drive, the positioner comprising:
a magnet assembly producing a magnetic field; and
a conductor assembly that couples to the E-block and is positioned near the magnet assembly, the conductor assembly including (i) a first coil array, and (ii) a second coil array positioned in substantially the same plane as the first coil array, wherein
the first coil array includes a first left leg, a first right leg, a first distal section and a first proximal section, the first left leg extends between the first distal section and the first proximal section, the first right leg extends between the first distal section and the first proximal section and is spaced from the first left leg, the first distal section extends between the first left leg and the first right leg, and the first proximal section extends between the first left leg and the first right leg and is spaced from the first distal section and is closer to the E-block than the first distal section is to the E-block,
the second coil array includes a second left leg, a second right leg, a second distal section and a second proximal section, the second left leg extends between the second distal section and the second proximal section, the second right leg extends between the second distal section and the second proximal section and is spaced from the second left leg, the second distal section extends between the second left leg and the second right leg, and the second proximal section extends between the second left leg and the second right leg and is spaced from the second distal section and is closer to the E-block than the second distal section is to the E-block, and
the first coil array encircles the second coil array, and the second left leg and the second right leg are parallel to a longitudinal axis of the E-block.

22. The positioner of claim 21 wherein
the first left leg and the first right leg interact with the magnetic field and the first distal section and the first proximal section do not interact with the magnetic field; and
the second left leg, the second right leg, second distal section and the second proximal section interact with the magnetic field.

23. The positioner of claim 22 wherein the first left leg, the first right leg and the first proximal section are straight, and the first distal section is arc-shaped.

24. The positioner of claim 22 wherein the second left leg, the second right leg and the proximal section are straight, and the second distal section is arc-shaped.

25. The positioner of claim 22 wherein
the first left leg, the first right leg and the first proximal section are straight, and the first distal section is arc-shaped; and
the second left leg, the second right leg and the proximal section are straight, and the second distal section is arc-shaped.

26. The positioner of claim 22 wherein the first left leg is not parallel to the first right leg.

27. The positioner of claim 22 wherein the first left leg is not parallel to the second left leg.

28. The positioner of claim 22 wherein the first right leg is not parallel to the second right leg.

29. The positioner of claim 22 wherein the first left leg and the first right leg are not parallel to the second left leg and the second right leg and are not parallel to each other.

30. The positioner of claim 21 wherein the first distal section is adjacent to the second distal section, and the first proximal section is adjacent to the second proximal section.

31. The positioner of claim 21 wherein the first proximal section is parallel to and adjacent to the second proximal section.

32. The positioner of claim 21 wherein the first distal section is adjacent to the second distal section, and the first proximal section is parallel to and adjacent to the second proximal section.

33. The positioner of claim 21 wherein the first left leg is closer to the second proximal section than the second distal section.

34. The positioner of claim 21 wherein the first right leg is closer to the second proximal section than the second distal section.

35. The positioner of claim 21 wherein
the first left leg is closer to the second proximal section than the second distal section; and
the first right leg is closer to the second proximal section than the second distal section.

36. The positioner of claim 21 wherein the first distal section intersects an imaginary line that extends through and is orthogonal to the second left leg and the second right leg.

37. The positioner of claim 21 wherein
the first left leg, the first right leg and the first proximal section are straight, and the first distal section is arc-shaped;
the second left leg, the second right leg and the proximal section are straight, and the second distal section is arc-shaped;
the first left leg is not parallel to the first right leg;
the first left leg is not parallel to the second left leg;
the first right leg is not parallel to the second right leg;
the first distal section is adjacent to the second distal section; and
the first proximal section is parallel to and adjacent to the second proximal section.

38. The positioner of claim 21 wherein
the first left leg is not parallel to the first right leg;
the first left leg is not parallel to the second left leg;
the first right leg is not parallel to the second right leg;
the first distal section is adjacent to the second distal section;
the first proximal section is parallel to and adjacent to the second proximal section;
the first left leg is closer to the second proximal section than the second distal section; and
the first right leg is closer to the second proximal section than the second distal section.

39. The positioner of claim 21 wherein
the first left leg, the first right leg and the first proximal section are straight, and the first distal section is arc-shaped;
the second left leg, the second right leg and the proximal section are straight, and the second distal section is arc-shaped;
the first left leg is not parallel to the first right leg;
the first left leg is not parallel to the second left leg;
the first right leg is not parallel to the second right leg;
the first distal section is adjacent to the second distal section;
the first proximal section is parallel to and adjacent to the second proximal section;
the first left leg is closer to the second proximal section than the second distal section; and
the first right leg is closer to the second proximal section than the second distal section.

40. The positioner of claim 39 wherein the first distal section intersects an imaginary line that extends through and is orthogonal to the second left leg and the second right leg.

* * * * *